United States Patent [19]

Takei

[11] Patent Number: 4,756,378
[45] Date of Patent: Jul. 12, 1988

[54] SYSTEM AND METHOD FOR CONTROLLING A VEHICLE SPEED THROUGH ADJUSTMENT OF A THROTTLE VALVE OF AN ENGINE

[75] Inventor: Akira Takei, Zama, Japan

[73] Assignee: Nissan Motor Company, Limited, Yokohama, Japan

[21] Appl. No.: 27,393

[22] Filed: Mar. 18, 1987

[30] Foreign Application Priority Data

Mar. 20, 1986 [JP] Japan .................................. 61-63359

[51] Int. Cl.⁴ ............................................. B60K 31/04
[52] U.S. Cl. ..................................... 180/179; 123/350
[58] Field of Search .................. 180/174, 178, 179; 123/350, 352

[56] References Cited

U.S. PATENT DOCUMENTS 4,520,778  6/1985  Nanjo et al. ........................ 180/179
4,540,060  9/1985  Kawata et al. ...................... 180/179

*Primary Examiner*—John J. Love
*Assistant Examiner*—Richard Camby
*Attorney, Agent, or Firm*—Foley & Lardner, Schwartz, Jeffery, Schwaab, Mack, Blumenthal & Evans

[57] ABSTRACT

A system and method for controlling a vehicle speed in which an opening angle of a throttle valve located within an intake air passage of an engine of the vehicle is adjusted to a first target opening angle set so as to correspond to a desired cruising vehicle speed in addition to the adjustment of the opening angle of throttle valve to a second target opening angle which is varied according to an operating variable (depression stroke) of an accelerator operator (accelerator pedal). The adjustment for opening angle of the throttle valve to the target opening angle set so as to correspond to the desired cruising vehicle speed is enabled when the target opening angle dependent upon the operating variable of the accelerator operator is below that set so as to correspond to the desired cruising vehicle speed and actual opening angle of the throttle valve reaches the first target opening angle during the transfer from the adjustment of the opening angle in accordance with the operating variable of the acceleration operator.

8 Claims, 5 Drawing Sheets

SYSTEM AND METHOD FOR CONTROLLING A VEHICLE SPEED THROUGH ADJUSTMENT OF A THROTTLE VALVE OF AN ENGINE

BACKGROUND OF THE INVENTION

The present invention relates to a system and method for controlling a vehicle speed in which the vehicle speed is controlled by adjusting an opening angle of a throttle valve located within a throttle chamber of an intake air passage of an engine. The present invention particularly relates to a system and method for controlling the vehicle speed which are capable of controlling the vehicle speed in accordance with a magnitude of an operating variable of acceleration operator and capable of maintaining the vehicle speed at a desired cruising speed.

A Japanese Patent Application First Publication (Tokkai) Sho No. 61-1546 published on Jan. 7, 1986 exemplifies a conventional vehicle speed control system.

In the conventional vehicle speed control system, when the throttle valve control is carried out in accordance with the magnitude of operating variable of the acceleration operator, a desired cruising speed control of the vehicle can be commanded through a set switch. At this time, the operating variable by which an accelerating operator is operated is stored as a criterion of a temporary release of the cruising speed running and a target vehicle speed is set. Consequently, the opening angle of the throttle valve is adjusted so that the vehicle is run at the target vehicle speed.

However, when the cruising speed running start is commanded during the acceleration of the vehicle through the operation of the acceleration operator and thereafter the acceleration operator becomes nonoperative state, an actual opening angle of the throttle valve remarkably exceeds a throttle valve target opening angle at which the cruising speed of the vehicle is maintained constant. A long time is required for the vehicle speed to converge to the target vehicle speed. In addition, a hunting occurs in the vehicle speed during the convergence of the vehicle speed to the target vehicle speed.

This is especially remarkable in vehicle control systems in which the target opening angle of the throttle valve cannot definitely be derived on the basis of the magnitude of the operating variable of the acceleration operator but be derived from a predetermined range of the target opening angle.

SUMMARY OF THE INVENTION

It is an object of the present invention to provide vehicle speed controlling system and method in which the vehicle speed can speedily be converged to the target vehicle speed of the cruising speed running without hunting of the vehicle speed when the cruising speed running is started after the acceleration of the vehicle in accordance with the magnitude of the operating variable of the acceleation operator.

The above-described object can be achieved by providing a system for controlling a vehicle speed, comprising: (a) first means for detecting an operating variable of an acceleration operator of the vehicle; (b) second means for deriving a target opening angle of a throttle valve located within an intake air passage of an engine of the vehicle on the basis of the operating variable of the acceleration operator; (c) third means for detecting an actual opening angle of the throttle valve; (d) fourth means for adjusting an opening angle of the throttle valve to the target opening angle derived by the second means; (e) fifth means for setting a desired cruising vehicle speed; (f) sixth means for detecting a vehicle speed; (g) seventh means for deriving another target opening angle of the throttle valve corresponding to the desired vehicle cruising speed set by the fifth means; (h) eighth means for adjusting the opening angle of the throttle valve to the target opening angle of the throttle valve derived by the seventh means; and (i) ninth means for inhibiting the adjustment of the opening angle by the fourth means and enabling a start of adjustment of the opening angle by the eight means when the target opening angle derived by the second means is below the target opening angle derived by the seventh means and the actual opening angle detected by the third means reaches the target opening angle derived by the seventh means so that the vehicle speed coincides with and is maintained at the desired cruising vehicle speed without hunting.

The above-described object can be achieved by providing a system for controlling a vehicle speed, comprising: (a) first means for detecting an operating variable of an acceleration operator of the vehicle; (b) second means for deriving a target opening angle of a throttle valve located within an intake air passage of an engine of the vehicle on the basis of the operating variable of the acceleration operator detected by the first means; (c) third means for detecting an actual opening angle of the throttle valve; (d) fourth means for adjusting an opening angle of the throttle valve to the target opening angle derived by the second means; (e) fifth means for operatively commanding a start of a vehicle cruising run; (f) sixth means for setting a target vehicle speed of the vehicle cruising run in response to the start command from the fifth means; (g) means for detecting a running speed of the vehicle; (h) eighth means for deriving another target opening angle of the throttle valve corresponding to the target opening angle set by the sixth means; (i) ninth means for adjusting the opening angle of the throttle valve to the target opening angle derived by the eighth means when the vehicle cruising run to the target vehicle speed set by the sixth means is carried out; (j) tenth means for determining transfer of adjustment for the opening angle of the throttle valve between that of the fourth means and that of the ninth means depending on whether both the target opening angle of the throttle valve derived by the second means and actual opening angle thereof drop to the opening angle of the throttle valve derived by the eighth means; and (k) eleventh means for transferring adjustment for the opening angle of the throttle valve to that of the ninth means according to the determination result of the tenth means that both the target opening angle of the throttle valve derived by the second means and actual opening angle drops to the target opening angle of the throttle valve derived by the eighth means.

The above described object can also be achieved by providing a method for controlling a vehicle speed, comprising the steps of: (a) detecting an operating variable of an acceleration operator of the vehicle; (b) deriving a target opening angle of a throttle valve located within an intake air passage of an engine of the vehicle on the basis of the operating variable of the acceleration operator; (c) detecting an actual opening angle of the throttle valve; (d) adjusting an opening angle of the throttle valve to the target opening angle derived by the step (b); (e) setting a desired cruising vehicle speed; (f) detecting a vehicle speed; (g) deriving another target opening angle of the throttle valve corresponding to the desired vehicle cruising speed set in the step (e); (h) adjusting the opening angle of the throttle valve to the target opening angle of the throttle valve derived in the step (g); and (i) inhibiting the adjustment for the opening angle carried out in the step (d) and enabling a start of adjustment of the opening angle when the target opening angle derived in the step (b) is below the target opening angle derived in the step (g) and the actual opening angle detected in the step (c) reaches the target opening angle derived in the step (g).

DETAILED DESCRIPTION OF THE PREFERRED EMBODIMENT

Reference will hereinafter be made to the drawings in order to facilitate understanding of the present invention.

Figure 1:
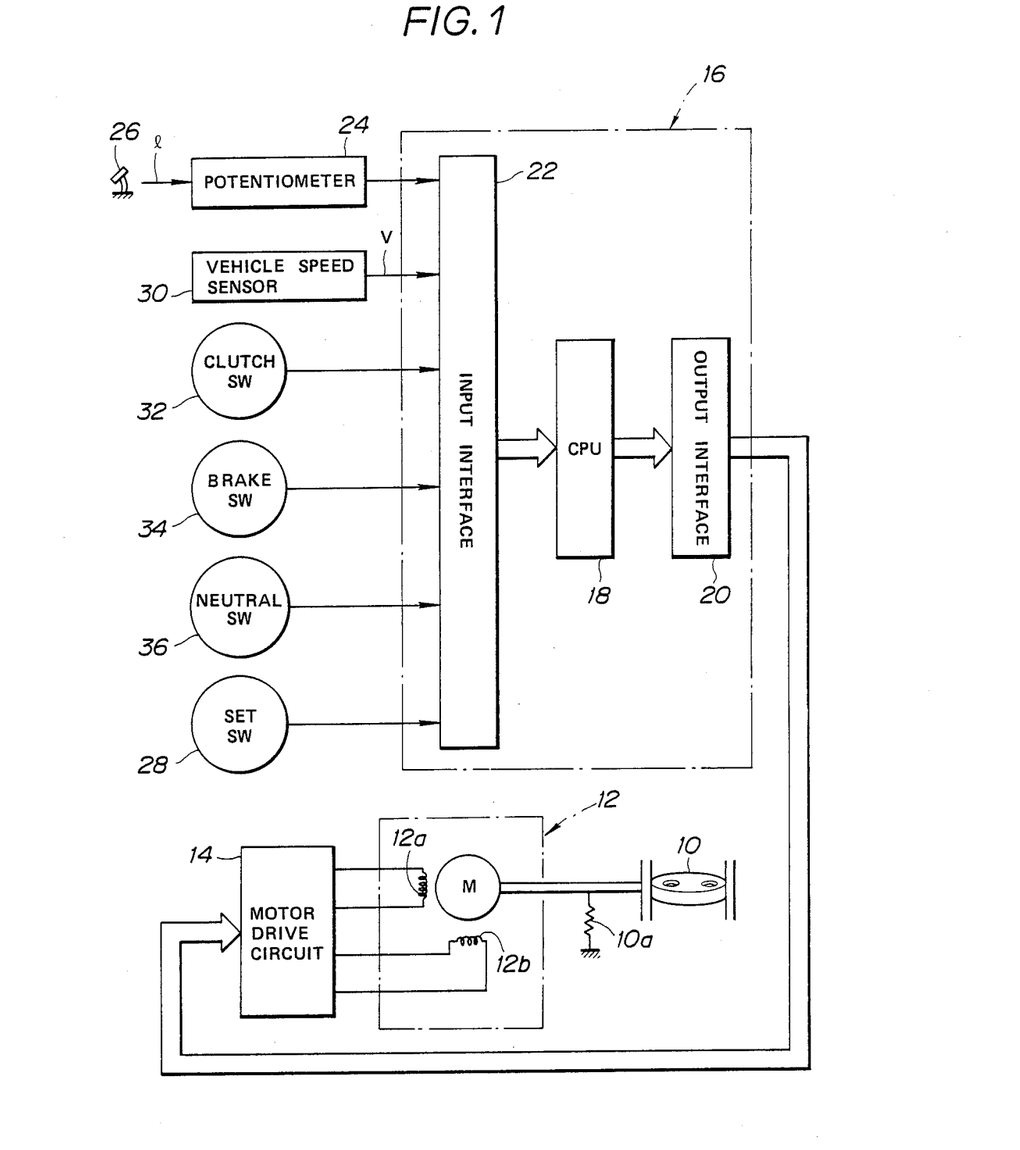
FIG. 1 is a circuit block diagram of a system for controlling a vehicle speed in a first preferred embodiment according to the present invention.

A throttle valve 10 of an engine shown in FIG. 1 is biased in a fully closed position for safety purposes by means of a return sprint 10a. The adjustment control of an opening angle of the throttle valve is carried out by means of a stepping motor 12. Windings 12a and 12b of the stepping motor 12 receive power supply from a motor drive circuit 14. The motor drive circuit 14, in turn, receives a motor control signal from a CPU (Central Processing Unit) 18 of a control circuit 16 via an output interface 20. The CPU 18 receives a detection signal of a potentiometer 24 via an input interface 22. The CPU 18 derives a motor drive signal according to an amount (stroke) of depression 1 of an accelerator pedal 26 detected by the potentiometer 24. Hence, the opening angle of the throttle valve 10 is adjusted according to a depression operation through the accelerator pedal 26. Then, the vehicle speed is adjusted. The structure of circuit peripheries around the stepping motor 12 is exemplified by U.S. patent applications Ser. No. 839,193 filed on Mar. 13, 1986 and Ser. No. 865,828 filed on May 22, 1986. The contents of the above-identified United States patent applications are hereby incorporated by reference.

The CPU 18 receive a switching signal from a set switch 28 and a detection signal from a vehicle speed sensor 30 via the input interface 22.

When a set switch 28 is operated, a vehicle speed V detected by a vehicle speed sensor 30 is set in a CPU 18 as a target vehicle speed $V_{SET}$ of the cruising speed running of the vehicle.

Then, since the opening angle of the throttle valve 10 is adjusted through the CPU 18 so that the vehicle speed V coincides with the target vehicle speed $V_{SET}$ and the cruising speed running of the vehicle is thus carried out.

Both switching signals derived from a clutch switch 32 and from a brake switch 34, both switches detecting operation of clutch pedal and brake pedal of the vehicle, and a switching signal of a neutral switch 36 derived when a transmission lever is placed at a neutral position are supplied to the CPU 18 via the input interface 22. These switching signals are handled as release command signals for releasing the cruising speed running operation of the vehicle speed controlling system shown in FIG. 1.

Figure 2:
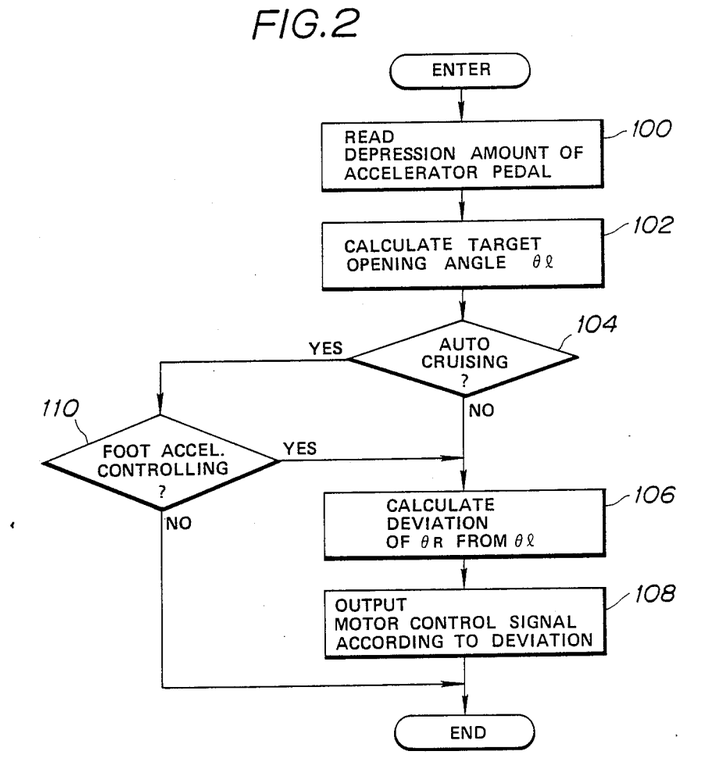
FIG. 2 is an explanatory view of a processing procedure of a CPU (Central Processing Unit) 18 shown in FIG. 1.

The CPU 18 repeats the processing of FIG. 2 for each predetermined period. In the processing routine of FIG. 2, the CPU 18 reads the amount of depression on the accelerator pedal 26 through a driver of the vehicle detected by the potentiometer 24 (in a step 100).

Figure 3:
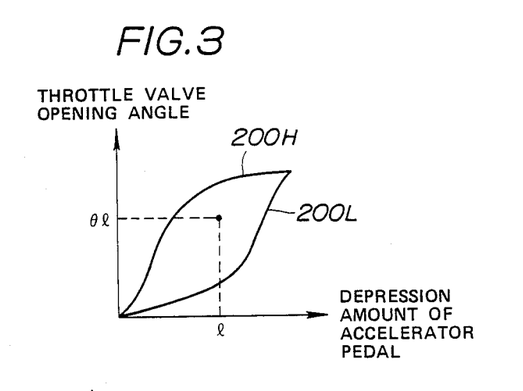
FIG. 3 is a characteristic graph for explaining a processing for deriving a target opening angle of a throttle valve from an amount by which an accelerator pedal is depressed.

When a target opening angle $\theta_l$ is derived from a valve opening angle range of the throttle valve 10 corresponding to the accelerator pedal depression amount l within a region enclosed by characteristics 200H and 200L in FIG. 3 (in a step 102). The CPU 18 determines from a switched position of the set switch 28 whether the cruising speed running of the vehicle is carried out (in a step 104).

When the vehicle does not run at the cruising speed in a step 104, a deviation of the actual opening angle $\theta_R$ with respect to the target opening angle $\theta_l$ of the throttle valve 10 is derived (in a step 106). The motor drive signal is the outputted according to a magnitude of the deviation (in a step 108).

Consequently, the opening angle of throttle valve 10 is adjusted according to the depression stroke of the accelerator pedal 26. The vehicle speed is thereby controlled according to the depression operation of the accelerator pedal 26.

It is noted that the actual opening angle $\theta_R$ of the throttle valve 10 is detected by th CPU 18 from a number of rotations of the stepping motor 12 as the result of the transmission of the motor drive signal to the motor drive circuit 14 by which the throttle valve opening angle is adjusted.

On the other hand, when the vehicle runs at the cruising speed running (yes in a step 104) and the CPU 18 determines that the acceleration of the vehicle is requested (yes in a step 110), an acceleration operator operating variable follow-up control is carried out such that a degree of control is larger than the adjustment of the opening angle of throttle valve 10 according to the depression amount l of the accelerator pedal 26 (in steps 106 and 108).

Figure 4A:
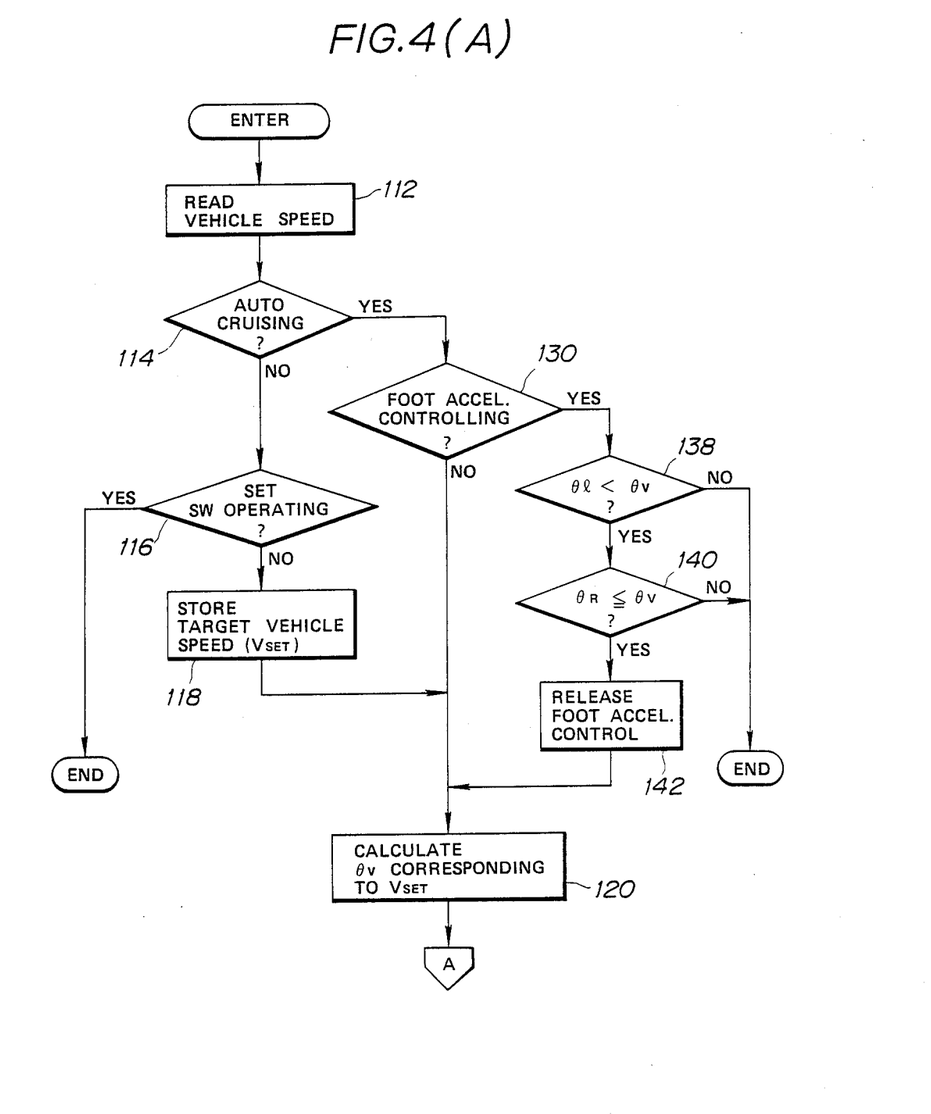
FIGS. 4(A) and 4(B) are explanatory views for explaining a processing procedure of the CPU 18 shown in FIG. 1.
Figure 4B:
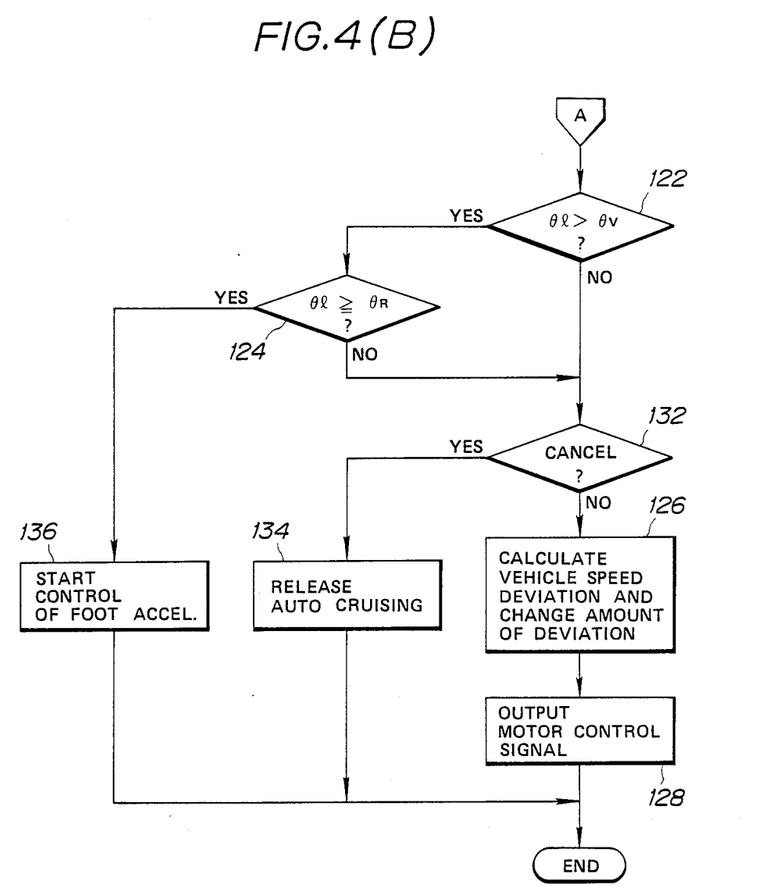

The CPU 18 carries out the processing of FIGS. 4(A) and 4(B) for each predetermined period different from the processing period of the routine shown in FIG. 2 in order to perform the vehicle cruising speed control in parallel to the above-described processing shown in FIG. 2.

In a first step 112, the CPU 18 reads the vehicle speed detected by the vehicle speed sensor 30.

In the next step 114, the CPU 18 determines whether the cruising speed running of the vehicle is carried out by checking whether the set switch 28 is in the on state.

When the CPU 18 determines that the cruising speed running of the vehicle is not being carried out (no in the step 114), the CPU 18 determines whether the set switch 28 is in the on state to command a start of the cruising speed running (in a step 116). When no command of the cruising speed running is issued in the step 116, the processing routine is directly ended.

When the set switch 28 is in the on state to issue the command to start the cruising speed running (yes in the step 116), the present vehicle speed V is stored as the target vehicle speed $V_{SET}$ which is detected and read by the vehicle speed sensor 30 in the step 118.

Figure 5:
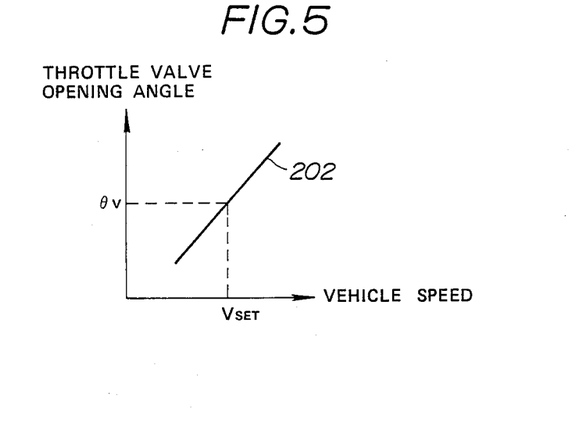
FIG. 5 is a characteristic explanatory view of calculation of a throttle valve opening angle corresponding to a target vehicle speed of a cruising speed running.

In addition, when the opening angle $\theta_V$ of the throttle valve 10 through which the vehicle can run on a flat road at the target vehicle speed $V_{SET}$ is derived from a characteristic 202 of FIG. 5 in a step 120, the CPU 18 compares the opening angle $\theta_V$ with the target opening angle $\theta_I$ in a step 122. When the CPU 18 determines that the opening angle $\theta_I$ exceeds the opening angle $\theta_V$, the CPU 18 compares the opening angle $\theta_I$ with the actual opening angle $\theta_R$ in a step 124.

When the target opening angle $\theta_I$ exceeds neither opening angle $\theta_V$ nor $\theta_R$ (no of either step 122 or 124), a deviation of the present vehicle speed V from the target vehicle speed $V_{SET}$ and amount of change in the deviation described above are calculated in a step 126.

In the next step 128, the CPU 18 outputs the motor control signal according to the result of calculation. Consequently, the cruising speed running of the vehicle is started in which the vehicle runs at the target vehicle speed $V_{SET}$.

During the subsequent cruising speed running of the vehicle (yes in the step 114), the motor control signal is outputted in the steps 126 and 128 according to the deviation between the target vehicle speed $V_{SET}$ and present vehicle speed V and the amount of change in the deviation. Consequently, the vehicle speed is maintained at the target vehicle speed $V_{SET}$.

When the clutch pedal is depressed or released, the brake pedal is depressed, or the transmission is placed in the neutral position during the cruising speed control (yes in the step 132), the control of the cruising speed running is released in a step 134. Consequently, the adjustment control of the throttle valve 10 in accordance with the operating variable of the accelerator pedal 26 is again started.

On the other hand, when the accelerator pedal 26 is depressed until the target opening angle $\theta_I$ set in accordance with the operating variable of the pedal 26 exceeds both the target opening angle $\theta_V$ set so as to correspond to the target vehicle speed $V_{SET}$ and actual throttle valve $\theta_R$, the CPU 18 determines that the acceleration of the vehicle has been requested in a step 136.

Consequently, with the cruising speed running control temporarily released, the vehicle speed control according to the accelerator pedal depression stroke is started (yes in the step 130→no in the step 138→end).

In the way described above, when the target opening angle $\theta_I$ exceeds the target opening angle $\theta_V$ corresponding to the target vehicle speed $V_{SET}$ and the accelerator pedal 26 is depressed until the target opening angle $\theta_I$ of the throttle valve 10 reaches the actual opening angle $\theta_R$ (yes in the step 124). The cruising speed control is temporarily inhibited. The vehicle speed control to follow the accelerator pedal operation is instead started so that the opening angles of $\theta_I$ and $\theta_R$ coincide with each other when the vehicle speed control to follow the acceleration operation is started. Consequently, the switching of control of the opening angle of the throttle valve to the vehicle speed control to follow the accelerator pedal operation is smoothly and speedily carried out.

Figure 6A:
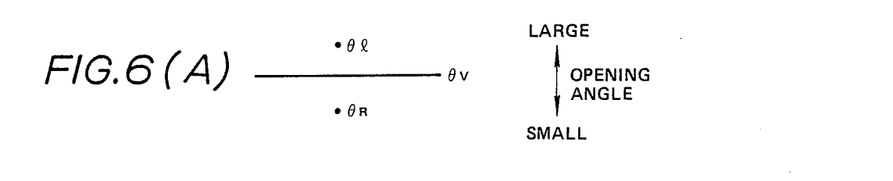
FIGS. 6(A) through 6(C) are explanatory views of operations of the vehicle speed controlling system shown in FIG. 1.
Figure 6B:
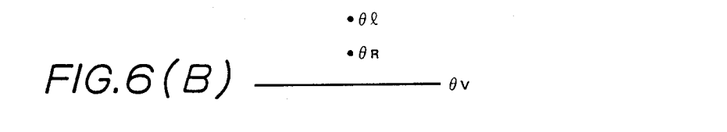

During the vehicle speed control to follow the accelerator pedal operation when the cruising speed running of the vehicle is carried out (yes in steps 114 and 130), the CPU 18 compares the target opening angle $\theta_I$ with the opening angle $\theta_V$ corresponding to the target vehicle speed in a step 138 and compares the actual opening angle $\theta_R$ with the opening angle $\theta_V$ (no of step 138). When the actual opening angle $\theta_R$ is not below the opening angle $\theta_V$ even though the target opening angle $\theta_I$ is below the opening angle $\theta_V$ (no in a step 140), the vehicle speed control to follow the accelerator pedal operation is continued. (Refer to FIGS. 6(A) and 6(B)).

On the other hand, when the target opening angle $\theta_I$ drops below the opening angle $\theta_V$ and the accelerator pedal 26 is returned until the actual opening angle $\theta_R$ is below the opening angle $\theta_V$ (yes in the step 140), the control to follow the accelerator operation is released in a step 142, the vehicle speed control to run the vehicle at the cruising vehicle speed $V_{SET}$ is again started.

Once the acceleration of the vehicle speed is started during the vehicle speed control to follow the accelerator pedal operation with the cruising speed control temporarily released, the target opening angle $\theta_I$ of the throttle valve 10 is below the opening angle $\theta_V$ corresponding to the target vehicle speed $V_{SET}$ of the cruising speed running of the vehicle. Furthermore, the control to follow the accelerator pedal operation is continued until the actual opening angle $\theta_R$ becomes accordingly below the opening angle $\theta_V$.

Figure 6C:
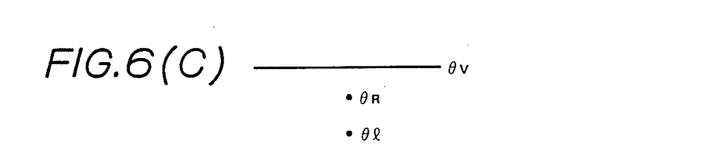

Then, when the target opening angle $\theta_I$ drops below the opening angle $\theta_V$ through the return operation of the accelerator pedal 26, the actual opening angle $\theta_R$ becomes accordingly below the opening angle $\theta_T$. At this time, the cruising speed running control is again started (Refer to FIG. 6(C)).

In the preferred embodiment of the vehicle speed control system, when the target opening angle $\theta_I$ becomes below the opening angle $\theta_V$ corresponding to the target vehicle speed $V_{SET}$ of the cruising speed running through the return operation of the accelerator pedal 26 carried out during the transfer from the acceleration operation of the vehicle to the cruising speed control and the throttle valve 10 is actually closed to the opening angle $\theta_V$ of the cruising speed running, the vehicle speed control to follow the accelerator pedal operation is ended and, instead, the cruising speed control of the vehicle is started. Therefore, it becomes possible to control the vehicle speed V to the target vehicle speed $V_{SET}$ of the cruising speed running of the vehicle smoothly and speedily without occurrence of overshooting and hunting during the transfer of control from the control to follow the accelerator pedal operation to the control to cruise the vehicle at the constant cruising speed.

Since in the system and method for controlling the vehicle speed according to the present invention when the target opening angle of the throttle valve derived on the basis of the accelerator pedal operation and actual opening angle become lower than the opening angle corresponding to the target vehicle speed of the cruising speed running, the vehicle speed control to follow the accelerator pedal operation is inhibited and instead the start of the vehicle speed control for the cruising speed run is enabled. Therefore, it becomes possible to control the vehicle speed to the target vehicle speed of the cruising speed running smoothly and speedily without occurrence of vehicle speed hunting.

It will fully be understood by those skilled in the art that the foregoing description is made in terms of the preferred embodiment and various changes and modifications may be made without departing from the scope of the present invention which is to be defined by the appended claims.

What is claimed is:

1. A system for controlling a vehicle speed, comprising:
   (a) first means for detecting an operating variable of an acceleration operator of the vehicle;
   (b) second means for deriving a target opening angle of a throttle valve located within an intake air passage of an engine of the vehicle on the basis of the operating variable of the acceleration operator;
   (c) third means for detecting an actual opening angle of the throttle valve;
   (d) fourth means for adjusting an opening angle of the throttle valve to the target opening angle derived by the second means;
   (e) fifth means for setting a desired cruising vehicle speed;
   (f) sixth means for detecting a vehicle speed;
   (g) seventh means for deriving another target opening angle of the throttle valve corresponding to the desired vehicle cruising speed set by the fifth means;
   (h) eighth means for adjusting the opening angle of the throttle valve to the target opening angle of the throttle valve derived by the seventh means; and
   (i) ninth means for inhibiting the adjustment of the opening angle by the fourth means and enabling a start of adjustment of the opening angle by the eighth means when the target opening angle derived by the second means is below the target opening angle derived by the seventh means and the actual opening angle detected by the third means reaches the target opening angle derived by the seventh means so that the vehicle speed coincides with and is maintained at the desired cruising vehicle speed without hunting.

2. A system for controlling a vehicle speed, comprising:
   (a) first means for detecting an operating variable of an acceleration operator of the vehicle;
   (b) second means for deriving a target opening angle of a throttle valve located within an intake air passage of an engine of the vehicle on the basis of the operating variable of the acceleration operator detected by the first means;
   (c) third means for detecting an actual opening angle of the throttle valve;
   (d) fourth means for adjusting an opening angle of the throttle valve to the target opening angle derived by the second means;
   (e) fifth means for operatively commanding a start of a vehicle cruising run;
   (f) sixth means for setting a target vehicle speed of the vehicle cruising run in response to the start command from the fifth means;
   (g) means for detecting a running speed of the vehicle;
   (h) eighth means for deriving another target opening angle of the throttle valve corresponding to the target opening angle set by the sixth means;
   (i) ninth means for adjusting the opening angle of the throttle valve to the target opening angle derived by the eighth means when the vehicle cruising run to the target vehicle speed set by the sixth means is carried out;
   (j) tenth means for determining transfer of adjustment for the opening angle of the throttle valve between that of the fourth means and that of the ninth means depending on whether both the target opening angle of the throttle valve derived by the second means and actual opening angle thereof drop to the opening angle of the throttle valve derived by the eighth means; and
   (k) eleventh means for transferring adjustment for the opening angle of the throttle valve to that of the ninth means according to the determination result of the tenth means that both the target opening angle of the throttle valve derived by the second means and actual opening angle drops to the target opening angle of the throttle valve derived by the eighth means.

3. The system according to claim 2, wherein the eleventh means transfers adjustment for the opening angle of the throttle valve from that of the fourth means to that of the ninth means when the target opening angle derived by the second means exceeds the target opening angle derived by the eighth means but below the actual opening angle detected by the third means.

4. The system according to claim 2, wherein the eleventh means does not transfer adjustment for the opening angle of the throttle valve from that of the fourth means to that of the ninth means when the target opening angle derived by the second means exceeds both the target opening angle derived by the eighth means and actual opening angle detected by the third means.

5. The system according to claim 1, wherein both the second and ninth means include a motor drive circuit and a stepping motor for adjusting the opening angle of the throttle valve according to a drive current derived from the motor drive circuit and the third means detects the actual opening angle on the basis of an amount of revolutions of the stepping motor.

6. The system according to claim 1, wherein the eleventh means does not transfer adjustment for the opening angle of the throttle valve from that of the fourth means to the ninth means when the target opening angle derived by the second means equal to or more than the opening angle derived by the eighth means.

7. The system according to claim 1, which further comprises:
   (a) twelfth means for detecting a disengagement of a transmission clutch of the engine;
   (b) thirteenth means for detecting a depression of a brake of the vehicle;
   (c) fourth means for detecting a neutral position of a shift lever of the vehicle; and
   (d) fifteenth means for cancelling adjustment for the opening angle of the throttle valve by the ninth means when at least one of the twelfth, thirteenth, and fourteenth detects the corresponding state.

8. A method for controlling a vehicle speed, comprising the steps of:
   (a) detecting an operating variable of an acceleration operator of the vehicle;

(b) deriving a target opening angle of a throttle valve located within an intake air passage of an engine of the vehicle on the basis of the operating variable of the acceleration operator with an electronic processing means;
(c) detecting an actual opening angle of the throttle valve;
(d) adjusting an opening angle of the throttle valve to the target opening angle derived by the step (b);
(e) setting a desired cruising vehicle speed;
(f) detecting a vehicle speed;
(g) deriving another target opening angle of the throttle valve corresponding to the desired vehicle cruising speed set in the step (e) with said electronic processing means;
(h) adjusting the opening angle of the throttle valve to the target opening angle of the throttle valve derived in the step (g); and
(i) inhibiting the adjustment for the opening angle carried out in the step (d) and enabling a start of adjustment of the opening angle when the target opening angle derived in the step (b) is below the target opening angle derived in the step (g) and the actual opening angle detected in the step (c) reaches the target opening angle derived in the step (g) with said electronic processing means.

* * * * *